(12) United States Patent
Kondo et al.

(10) Patent No.: US 6,215,421 B1
(45) Date of Patent: Apr. 10, 2001

(54) CODING APPARATUS AND METHOD, DECODING APPARATUS AND METHOD, DATA PROCESSING SYSTEM, AND STORAGE MEDIUM

(75) Inventors: Tetsujiro Kondo, Tokyo; Kenji Tanaka, Chiba; Yoshinori Watanabe, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/448,543

(22) Filed: Nov. 23, 1999

(30) Foreign Application Priority Data

Nov. 25, 1998 (JP) .................................................. 10-333700

(51) Int. Cl.$^7$ ...................................................... H03M 7/00
(52) U.S. Cl. .............................. 341/50; 358/426; 382/212
(58) Field of Search ................................. 341/50, 109, 51, 341/60, 73; 358/426; 345/435; 382/56, 212

(56) References Cited

U.S. PATENT DOCUMENTS

| | | | |
|---|---|---|---|
| 5,309,526 | * 5/1994 | Pappas et al. ........................ | 382/56 |
| 5,734,752 | * 3/1998 | Knox ................................... | 382/212 |
| 5,861,892 | * 1/1999 | Sata et al. ............................ | 345/435 |
| 6,052,205 | * 4/2000 | Matsuura ............................. | 358/426 |

OTHER PUBLICATIONS

Tirkel A Z et al: "Electronic Water Mark" Conference Proceedings DICTA, Dec. 1993, XP000668971.

Mobasseri B G: "Ordered Bitplane Watermarking of Digital Video by Direct Sequence Spread Spectrum" Proceedings International Workshop on Multi–Media Database Management Systems (CAT. No. 98TB100249), Proceedings of 1998 International Workshop on Multimedia Database Management, Dayton, OH, USA, Aug. 5–7, 1998, pp. 66–71, XP002136165.

Sanford M T et al: "The Data Embedding Method" Proceedings of the SPIE, US, SPIE, Bellingham, VA, vol. 2615, Oct. 23, 1995, pp. 226–259, XP000601271.

* cited by examiner

Primary Examiner—Brian Young
Assistant Examiner—John Nguyen
(74) Attorney, Agent, or Firm—Frommer Lawrence & Haug, LLP.; William S. Frommer; Dexter T. Chang

(57) ABSTRACT

A coding apparatus for embedding second data into first data without deterioration of the first data, and a decoding apparatus for decoding coded data in which first data is coded in accordance with second data are provided. The coding apparatus embeds the second data into the first data by interchanging at least one block of at least a part of the first data in units of bit planes in accordance with the second data. The decoding apparatus decodes the coded data into the first data by dividing at least a part of data in which the second data is embedded into blocks and by interchanging blocks in units of bit planes on the basis of correlations between bits within each bit plane of the block, and decodes the second data which is embedded into the coded data in accordance with the interchanging.

17 Claims, 15 Drawing Sheets

IMAGE TRANSMISSION SYSTEM

FIG. 3
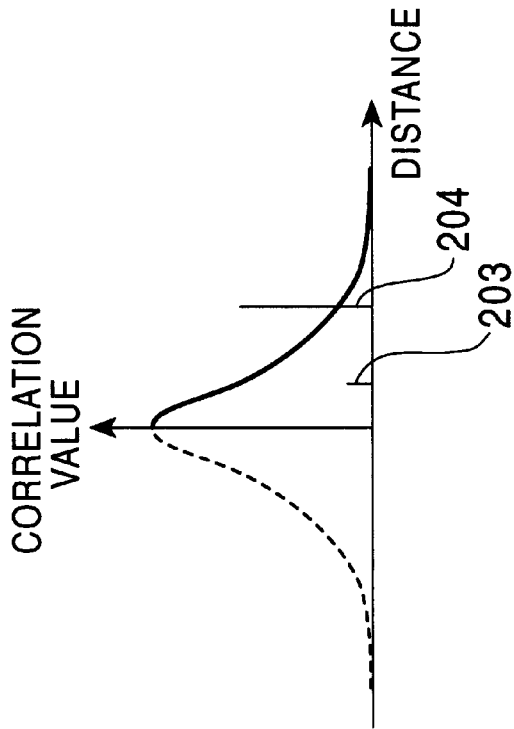
(A)
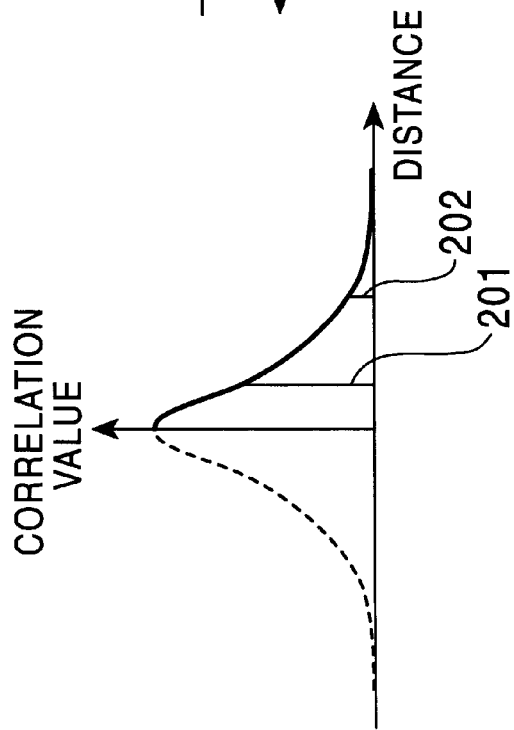
(B)
EMBEDDED CODING / DECODING

UTILIZATION OF SIMILARITY

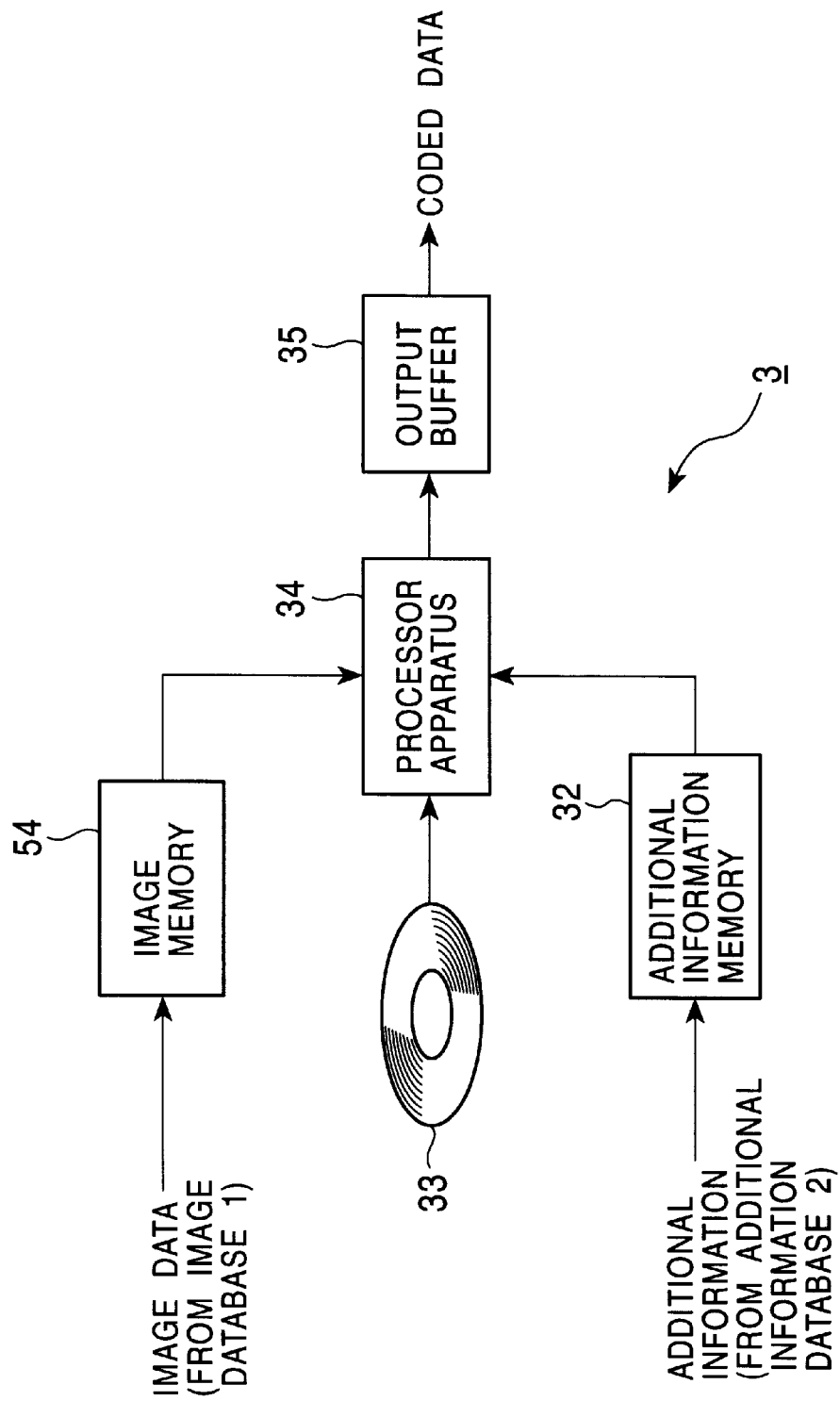

CODING APPARATUS AND METHOD, DECODING APPARATUS AND METHOD, DATA PROCESSING SYSTEM, AND STORAGE MEDIUM

BACKGROUND OF THE INVENTION

1. Field of the Invention

The present invention relates to a coding apparatus and method, a decoding apparatus and method, a data processing system, and a storage medium. In particular, the present invention relates to a coding apparatus and method, a decoding apparatus and method, a data processing system, and a storage medium, which allow information to be embedded into data without deterioration in decoded image and without increase in the amount of data.

2. Description of the Related Art

An example of a technique for embedding information without increasing the amount of data is such that the LSB or the lowest two bits of digital audio data are converted into information to be embedded. In this technique, the fact that the lowest bit or bits of digital audio data do not exert much influence on its sound quality is utilized and the lowest bit or bits of digital audio data are simply replaced by information to be embedded. Therefore, at the time of reproduction, information-embedded digital audio data is output as it is, that is, the digital audio data is output in a state that information is embedded therein because it is difficult to return the information-embedded lowest bit or bits to the original state and the lowest bit or bits do not exert much influence on the sound quality.

However, in the above technique, a signal that is different from the original signal is output. Therefore, influence occurs in the sound quality when the signal is audio data or in the image quality when the signal is video data.

SUMMARY OF THE INVENTION

It is an object of the present invention to overcome the above-described problems.

To achieve the above-mentioned object, according to one aspect of the present invention, there is provided a coding apparatus for coding first data in accordance with second data, the coding apparatus comprising: a blocking unit for dividing data of at least a part of the first data into blocks which are formed in such a way that a plurality of pieces of data of a predetermined number of bits are collected; a dividing unit for dividing the block into bit planes for each bit of a bit sequence representing the data of a predetermined number of bits; and a coding unit for embedding data related to the second data into first data by interchanging at least one block of at least a part of the first data in units of bit planes in accordance with the second data.

According to another aspect of the present invention, there is provided a decoding apparatus for decoding coded data in which first data is coded in accordance with second data, the decoding apparatus comprising: a blocking unit for dividing at least a part of the coded data into blocks which are formed in such a way that a plurality of pieces of data of a predetermined number of bits are collected; a dividing unit for dividing the block into bit planes for each bit of a bit sequence representing the data of a predetermined number of bits; a correlation computation unit for determining correlations between bits within each bit plane of the block; and a decoding unit for decoding the coded data into the first original data by interchanging at least one block of at least a part of the coded data in units of bit planes on the basis of the correlations determined by the correlation computation unit and for decoding the second data which is embedded into the coded data in accordance with the interchanging.

The above and further objects, aspects and novel features of the invention will become more apparent from the following detailed description when read in connection with the accompanying drawings.

BRIEF DESCRIPTION OF THE DRAWINGS

FIG. 3 is a conceptual view showing (A) an image before being coded or a decoded result by utilizing correlation, and (B) a result in which the image is coded by utilizing correlation according to the embodiment of the present invention.

FIG. 6 is a block diagram showing an example of the construction of the hardware of an embedded encoder 3 of FIG. 1.

DESCRIPTION OF THE PREFERRED EMBODIMENT

A coding apparatus and method, a decoding apparatus and method, a data processing system, and a storage medium according to the present invention will be hereinafter described with reference to the accompanying drawings.

Figure 1:
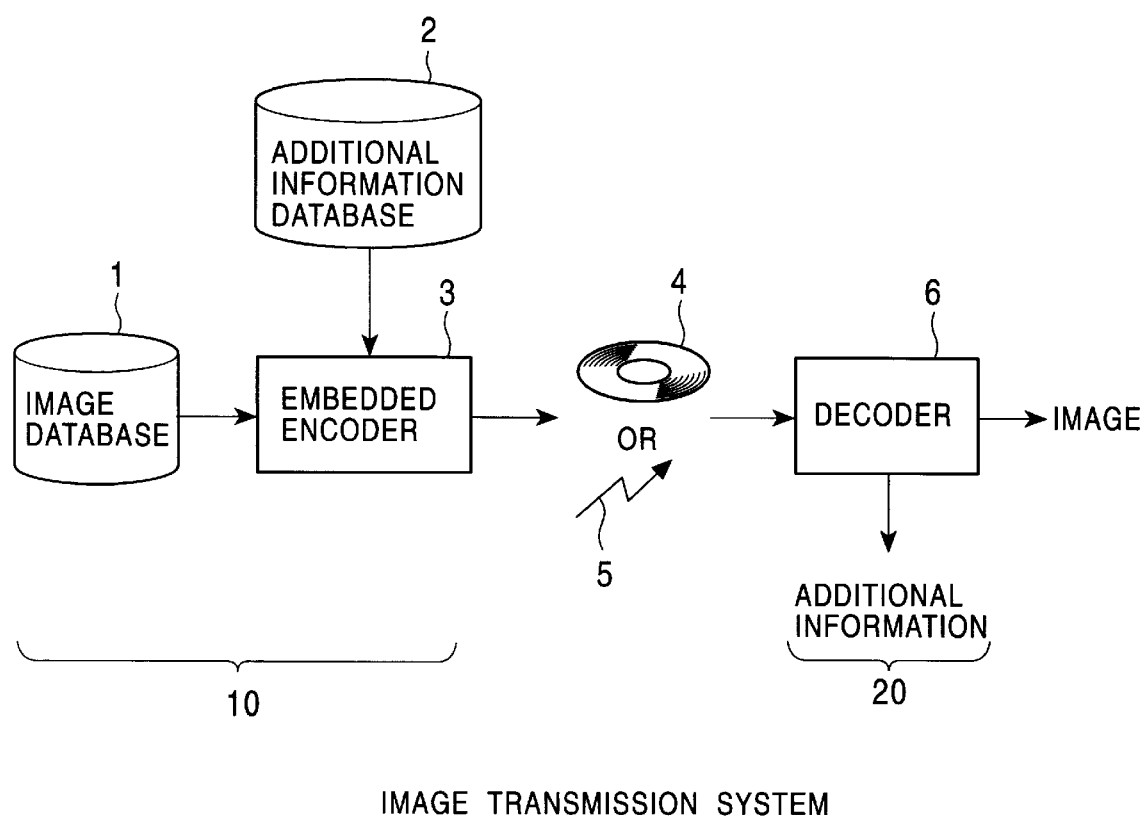
FIG. 1 is a block diagram showing an embodiment of an image transmission system to which the present invention is applied.

FIG. 1 shows an example of the construction of an embodiment of an image transmission system to which the present invention is applied. Here, the term "system" refers to one in which a plurality of apparatuses are logically assembled, and it does not matter whether or not the constituent apparatuses are contained within the same housing.

The image transmission system comprises a coding apparatus 10 and a decoding apparatus 20. The coding apparatus 10 codes a coding object, for example, an image, and outputs coded data. The decoding apparatus 20 decodes the coded data into the original image.

An image database 1 has stored therein images to be coded, for example, digital images. An image stored in the image database 1 is read from the image database 1 and is supplied to an embedded encoder 3.

An additional information database 2 has stored therein additional information, for example, digital data, as additional information to be embedded into an image for an object of coding. Additional information stored in the additional information database 2 is also read from the additional information database 2 and is supplied to the embedded encoder 3.

In the embedded encoder 3, an image from the image database 1 and addition information from the additional information database 2 are received. The embedded encoder 3 codes an image in accordance with the additional information from the additional information database 2 and outputs it so that the coded image can be decoded by using the deviation of energy of the image from the image database 1. The embedded encoder 3 codes an image by embedding additional information into the image so that the coded image can be decoded by using the deviation of energy of the image, and outputs the coded data. The coded data output from the embedded encoder 3 is recorded on a recording medium 4 which is, for example, a semiconductor memory, an magneto-optical disk, a magnetic disk, an optical disk, magnetic tape, or a phase-change disk, or is transmitted as a signal via a transmission medium 5, which is, for example, terrestrial waves, a satellite link, a CATV (Cable Television) network, the Internet, or a public network, and is provided to the decoding apparatus 20.

The decoding apparatus 20 comprises a decoder 6 and receives coded data provided via the recording medium 4 or the transmission medium 5. The decoder 6 decodes coded data into the original image and the additional information by using the deviation of the energy of the image. The decoded image is supplied to, for example, a monitor (not shown) and is displayed thereon. The decoded additional information is, for example, text data related to the image, audio data, a reduced image, etc.

Next, the principles of the embedded coding in the embedded encoder 3 shown in FIG. 1 and the decoding in the decoder 6 also shown in FIG. 1 will be described.

In general, what is called "information" has deviation of energy or entropy, and this deviation is recognized as valuable information. That is, for example, the reason an image obtained by taking a photograph of a particular scene is recognized by a human being as an image of that scene is that the image, for example, the pixel values, etc., of the respective pixels which form the image has deviation of energy corresponding to the scene, and an image having no deviation of energy is just noise, etc., and contains no useful information.

Therefore, even when some operation is performed on valuable information and the original deviation of the energy of the information is broken, valuable information can be restored to the original information by returning the broken deviation of the energy to the original state. That is, the coded data in which information is coded can be decoded to the original information by using the original deviation of the energy of the information.

For example, the deviation of the energy of information is reproduced by correlation, continuity, similarity, etc.

The correlation of information refers to the correlation, for example, self-correlation, distance between a particular constituent element and another constituent element, etc., among constituent elements (for example, in the case of an image, pixels, lines, etc., which form the image) of the information. An example of correlation is correlation between two lines of an image that is a correlation value represented by the sum of the squares of the differences between corresponding pixel values.

Figure 2:
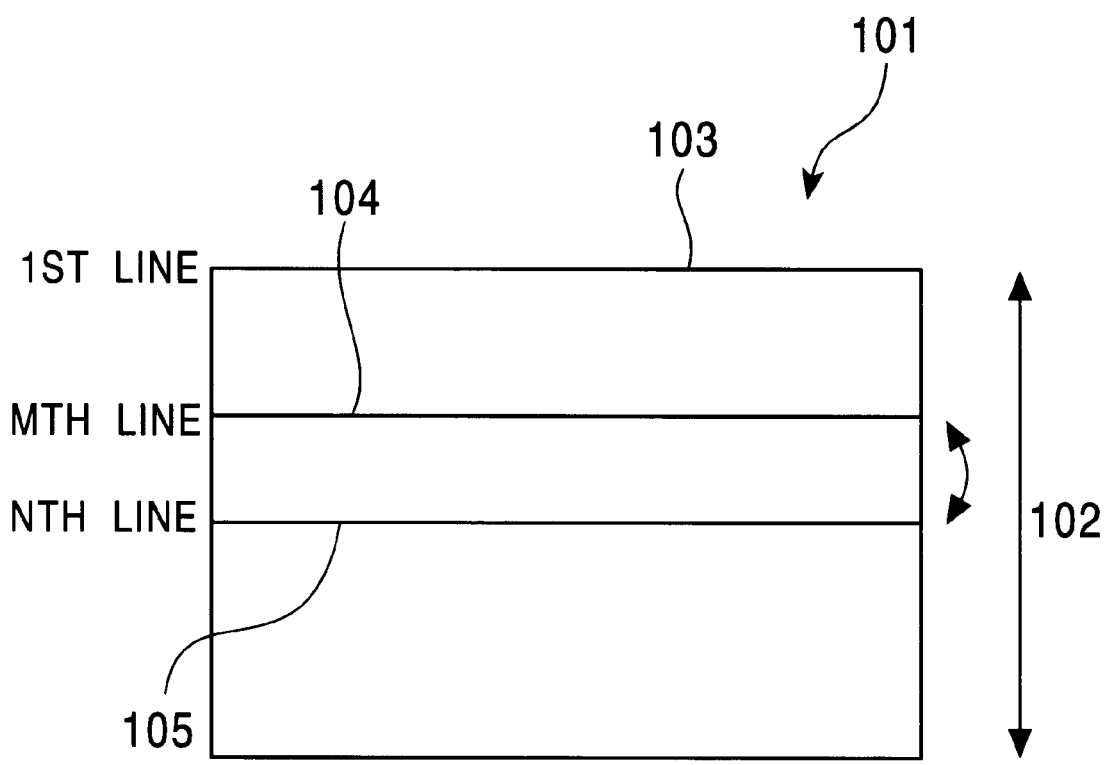
FIG. 2 is a view showing an image for an object of coding according to the present invention.

For example, now assume an image 101 having H lines 102 as shown in FIG. 2. In general, as shown at (A) of FIG. 3, the correlation value between the first-row line (first line) 103 from the top of the image and each of the other lines is larger when the line is closer to the first line 103 (i.e., located higher in the image of FIG. 2) as indicated by a correlation value 201 with the Mth line, and is smaller when the line is more distant from the first line 103 (i.e., located lower in the image of FIG. 2) as indicated by a correlation value 202 with the Nth line. That is, there is a deviation of correlation values that the correlation value with the first line 103 is larger for a line closer to the first line 103 and smaller for a line more distant from the first line 103.

In the image 101 of FIG. 2, a manipulation is performed that interchanges the pixel values of the Mth line 104 that is relatively close to the first line 103 with those of the Nth line 105 that is relatively distant from the first line 103. Correlation values between the first line 103 and the other lines in the line-interchanged image 101 are as shown at (B) of FIG. 3, for example.

In the line-interchanged image 101, the correlation value with the Mth line 104 that is close to the first line 103 becomes small as indicated by a correlation value 203 with the Mth line and the correlation value with the Nth line 105 that is distant from the first line 103 becomes large as indicated by a correlation value 204 with the Nth line.

Therefore, at (B) of FIG. 3, the deviation of correlation that correlation value is larger for a line closer to the first line 103 and smaller for a line more distant from the line 103 is broken. However, the deviation of the broken correlation can be repaired to the original state by utilizing the deviation of correlation that the correlation value is larger for a line closer to the first line 103 and smaller for a line more distant from the first line 103. At (B) of FIG. 3, the facts that the correlation value with the Mth line 104 that is closer to the first line 103 is small and the correlation value with the Nth line 105 that is distant from the first line 103 is large are clearly unnatural in view of the original deviation of the correlation of the image, and hence the original deviation of correlation is restored by interchanging the Mth line 104 and the Nth line 105 with each other. An image having the deviation of correlation shown at (A) of FIG. 3, that is, the original image 101, is restored by interchanging the Mth line 104 and the Nth line 105 at (B) of FIG. 3 with each other.

In the case described above with reference to FIG. 2 and FIG. 3, the image is coded by line interchanging. In the coding, for example, the embedded encoder 3 determines based on additional information which lines should be moved or which lines should be interchanged with each other. On the other hand, the decoder 6 restores the original image from a coded image, that is, a line-interchanged image, by moving the interchanged lines to their original positions by utilizing the correlation of the coded image. Further, in the decoding, at the same time, the decoder 6 restores additional information embedded in the image by detecting, for example, which lines were moved or which lines were interchanged with each other.

Figure 4A:
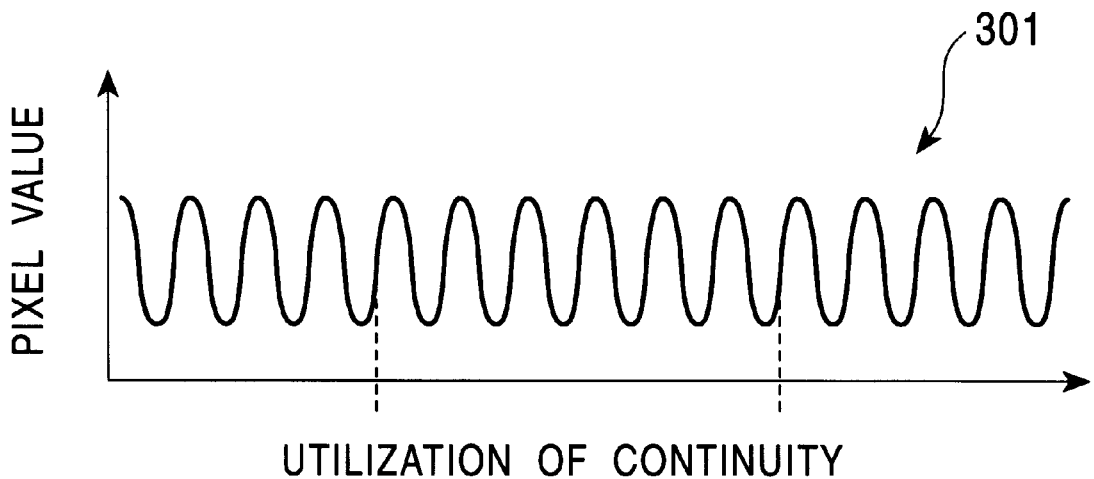
FIG. 4A is a view showing an image before being coded or a decoded result by utilizing continuity according to the embodiment of the present invention.

As for the continuity, assume that for a particular line of an image, a waveform 301 as shown in FIG. 4A is observed in which the variation pattern of pixel values is continuous. In another line that is distant from the above line, a variation pattern of pixel values is observed that is different in continuity from the variation pattern of the above line; a deviation of continuity also exists. That is, when attention is paid to a particular pixel value variation pattern, a deviation of continuity is found that a similar pixel value variation pattern exists in an adjacent portion and the pixel value variation pattern becomes more different as the position goes away.

Figure 4B:
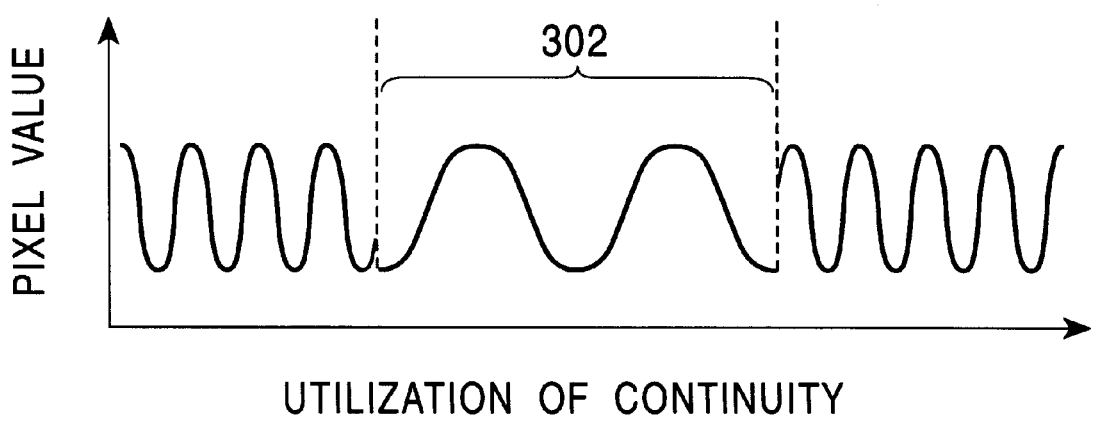
FIG. 4B is a view showing a result in which the image is coded by utilizing continuity according to the embodiment of the present invention.

For example, part of the waveform 301 shown in FIG. 4A in which the variation pattern of pixel values is continuous is replaced by the waveform 301 and has a different variation pattern of pixel values as shown in FIG. 4B.

In the case of FIG. 4B, the above-described deviation of continuity is broken. However, the broken continuity can be repaired by utilizing the deviation of continuity that portions adjacent to each other has continuous pixel value variation patterns and pixel value variation patterns become more different when they are more distant from each other. Specifically, in FIG. 4B, the pixel value variation pattern 302 of the part of the waveform is clearly different from the pixel value variation patterns of the other parts, and hence the deviation of continuity of the original image can be restored by replacing the pixel value variation pattern 302 with a waveform having a pixel value variation pattern similar to the pixel value variation patterns of the other parts. The waveform shown in FIG. 4A, that is, the original waveform, can be restored from the waveform shown in FIG. 4B by performing such replacement.

In the case described above with reference to FIGS. 4A and 4B, the image coding is to replace part of the waveform with a pixel value variation pattern that is much different from adjacent pixel value variation patterns. In the coding, for example, the embedded encoder 3 determines based on additional information what part of the waveform should be changed greatly in pixel value variation pattern and how greatly the pixel value variation pattern should be changed. The decoder 6 restores the original waveform from a coded signal, that is, a waveform having a part with a much different pixel value variation pattern by utilizing the deviation of continuity that adjacent pixel value variation patterns are continuous and pixel value variation patterns become more different when they are more distant from each other. Further, in the decoding, at the same time, the decoder 6 restores embedded additional information by detecting, for example, what part of the waveform was changed greatly in pixel value variation pattern and how greatly the pixel value variation pattern was changed.

As for the similarity of information, it is known that part of an image obtained by photographing a scene, for example, is generated by utilizing fractal, that is, self-similarity, of the image. For example, a photographed image of a sea 401 and a forest 402 shown in FIG. 5A has a deviation of similarity that the similarity between the pixel value variation pattern of a portion of the sea 401 and that of another portion of the sea 401 is high but the similarity between the pixel value variation pattern of the same portion and that of a portion in the forest 402 that is distant from the sea 401 is low. The same thing is true of the similarity of a shape itself such as an edge shape pattern of an image portion rather than a pixel value variation pattern.

Figure 5A:
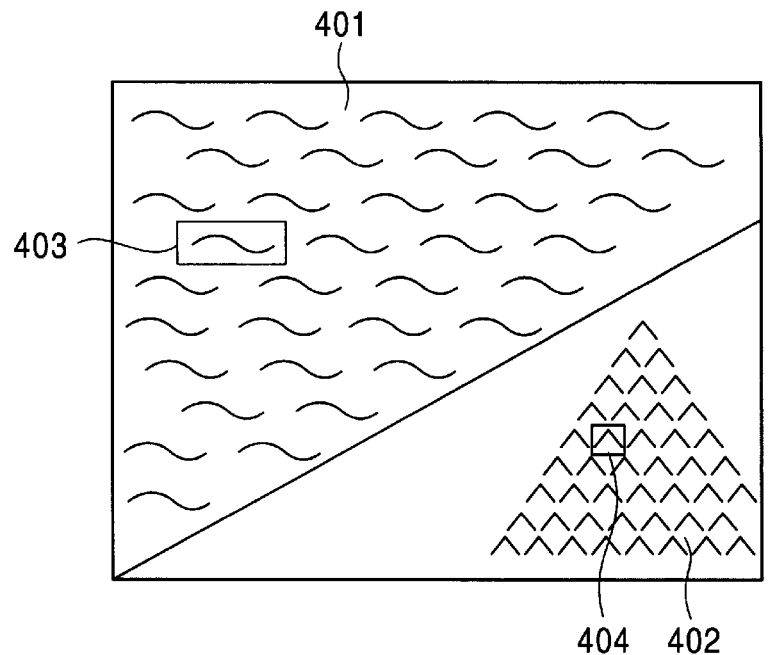
FIG. 5A is a view showing an image before being coded or a decoded result by utilizing similarity according to the embodiment of the present invention.
Figure 5B:
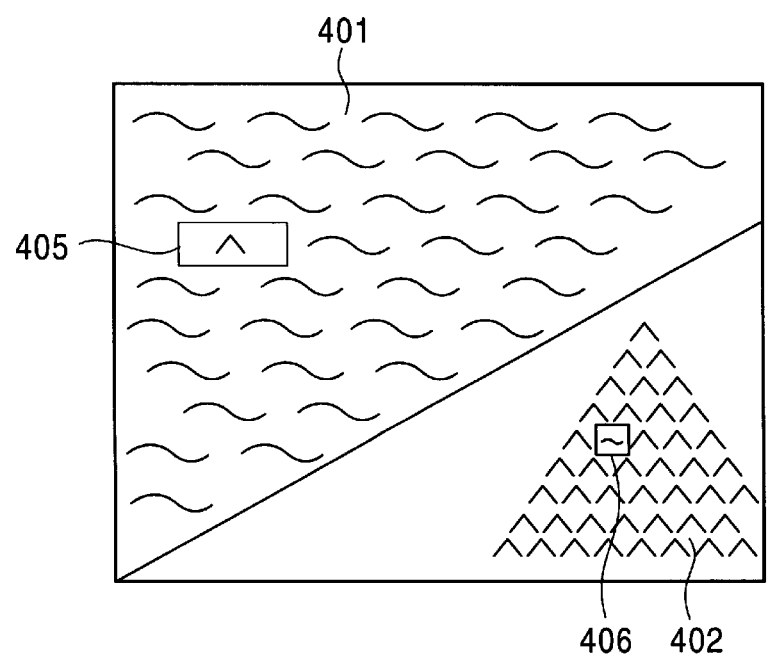
FIG. 5B is a view showing a result in which the image is coded by utilizing similarity according to the embodiment of the present invention.

For example, a part 403 of the sea 401 shown in FIG. 5A is replaced by a part 404 of the forest 402 as shown in FIG. 5B.

In FIG. 5B, the above-described deviation of similarity is broken. However, the broken deviation of similarity can be repaired by utilizing the deviation of similarity that adjacent pixel value variation patterns are high in similarity and the similarity becomes lower when pixel value variation patterns are more distant from each other. Specifically, in FIG. 5B in which a part of image of the sea 401 is made a part 405 of the image of the forest 402, the similarity between a portion in the sea 401 and the replaced part 405 of the image of the forest 402 is clearly lower than the similarity between portions within the image of the sea 401. The deviation of similarity of the original image is restored by replacing the part 405 that is made the image of the forest 402 with an image having characteristics that are similar to those of an image of the sea 401 around that part 405, that is, a part 406 of the image of the sea 401. The image shown in FIG. 5A, that is, the original image, is restored from the image shown in FIG. 5B by performing such replacement.

In the case described above with reference to FIGS. 5A and 5B, the image coding is to replace the part 403 of the image of the sea 401 with the part 404 of the image of the forest 402. In the coding, for example, the embedded encoder 3 determines based on additional information what part (e.g., a position on the picture) of the image of the sea 401 should be replaced by the part 404 of the image of the forest 402. The decoder 6 restores the original image shown in FIG. 5A from a coded signal, that is, the image of sea 401 having the part 405 of the image of the forest 402 by utilizing the deviation of similarity of the coded signal that adjacent pixel value variation patterns are high in similarity and the similarity becomes lower when pixel value variation patterns are more distant from each other. Further, in the decoding, at the same time, the decoder 6 restores embedded additional information by, for example, detecting what part of the image of the sea 401 was replaced by part of the image of the forest 402.

As described above, the embedded encoder 3 codes a coding object image in accordance with additional information so that decoding will be performed by utilizing an energy deviation of the image. The decoder 6 decodes coded data into the original image and the additional information without any overhead for decoding by utilizing an energy deviation of the image.

Since additional information is embedded into a coding object image, a resulting image is rendered different from the original state and unrecognizable as valuable information. That is, encryption of the coding object image without any overhead is realized.

Further, completely reversible digital watermarking is realized. For example, in the conventional digital watermarking, the lowest bits of pixel values having not much influence on the image quality are simply changed to values corresponding to a digital watermark. However, it is difficult to return the lowest bits to the original values. Therefore, changing the lowest bits as digital watermarking causes deterioration in the image quality of a decoded image. In the embedded coding of the invention, in the case where coded data is decoded by utilizing an energy deviation of the original image, the original image having no deterioration and additional information are obtained. Therefore, the image quality of a decoded image is not deteriorated even if the additional information is used as digital watermarking information.

Since embedded additional information is taken out by decoding coded data into an image, side information is provided without any overhead. In other words, since additional information is embedded into the image without any overhead that is usually necessary to take out the additional information, coded data that is obtained as a result of the embedding is compressed by an amount corresponding to the additional information. For example, if a half of an image is made a coding object and the other half is made additional information and if the latter half of the image is embedded into the half image as the coding object, the image is simply compressed into ½ of the original image.

Since coded data is decoded by utilizing an energy deviation of the original image which is, so to speak, a statistical quantity, the error resistance is high. That is, robust coding which is coding high in robustness is realized.

Since coded data is decoded by utilizing an energy deviation of the original image, there is a possibility that more additional information is embedded when the energy deviation is more characteristic, that is, when, in the case of an image, the activity of the image is higher or its redundancy is lower. As described above, coded data obtained as a result of embedding additional information is compressed by an amount corresponding to the additional information. That is, the compression ratio is larger when the activity of the image is higher or the redundancy of the image is lower. For example, in the MPEG (Moving Picture Experts Group) scheme which is a conventional coding scheme, basically the compression ratio is smaller when the activity of an image is higher or the redundancy of an image is lower. The embedded coding scheme of the invention is much different from the conventional coding schemes in this respect.

An image can be provided with a voice used as a key by making an image a coding object and employing, as additional information, information of a different medium than an image, for example, a voice. Specifically, on the coding apparatus 10 side, a voice spoken by the subscriber, such as "Open sesame", is embedded as additional information into an image. On the decoding apparatus 20 side, a user is requested to speak a voice "Open sesame" and speaker recognition is performed by comparing the voice of the user with the voice embedded in the image. This speaker recognition allows automatic presentation of the image only when the user is the subscriber. A voice waveform itself, as well as what is called a feature parameter of a voice, can be used as additional information.

A voice can be provided with an image used as a key (e.g., voice response after face recognition) by making a voice a coding object and employing, as additional information, information of a medium different than a voice, for example, an image. Specifically, on the coding apparatus 10 side, for example, an image of the face of a user is embedded into, for example, a voice as a response to the user. On the decoding apparatus 20 side, the face of a user is photographed and a voice in which a face image which matches the photographed image is embedded is output. In this manner, a voice response system which makes voice responses that are different for respective users is realized.

It is also possible to embed information of a particular medium into another information of the same medium, such as embedding one voice into another voice or embedding one image into another image. Further, by embedding a voice and a face image of the subscriber, what is commonly called a "double-key system" can be realized in which an image can be presented only when a voice and a face image of a user coincide with those embedded in the image.

For example, it is also possible that one of an image and a voice that constitute a television broadcast signal and are, so to speak, synchronized with each other is embedded into the other. In this case, what is called a true integrated signal can be realized in which pieces of information of different media are integrated with each other.

In the embedded coding scheme of the invention, as described above, more additional information may be embedded into information when the energy deviation of the information is more characteristic. Therefore, the overall data amount is controlled by, for example, adaptively selecting one of two pieces of information having a more characteristic energy deviation and embedding the other into the selected piece of information. That is, it becomes possible to cause one of two pieces of information to absorb the information quantity of the other. Controlling the overall data amount enables information transmission using a data amount that conforms to the transmission bandwidth and the use status of a transmission line and other factors of the transmission environment (i.e., environment-adaptive network transmission).

For example, coding in which higher-layer information having a smaller information quantity than lower-layer information is generated (what is called layered coding) is realized without increasing the amount of data by embedding a reduced image into the original image or by embedding a compressed voice into the original voice.

For example, by embedding an image to serve as a key for retrieving each original image into each original image, a database is realized in which an image is retrieved based on a key image.

Next, FIG. 6 shows an example of the construction of the hardware of the embedded encoder 3 of FIG. 1 in a case where embedded coding is performed for embedding additional information into an image so that the image can be restored into the original state by using the correlation of the image. The operation of the embedded encoder 3 is controlled by a controller (not shown), etc.

Image data supplied from the image database 1 is input to an image memory 31. The image memory 31 temporarily stores images from the image database 1, for example, in frame units. Also, additional information supplied from the additional information database 2 is input to an additional information memory 32, and the additional information memory 32 temporarily stores the additional information from the additional information database 2.

Figure 7:
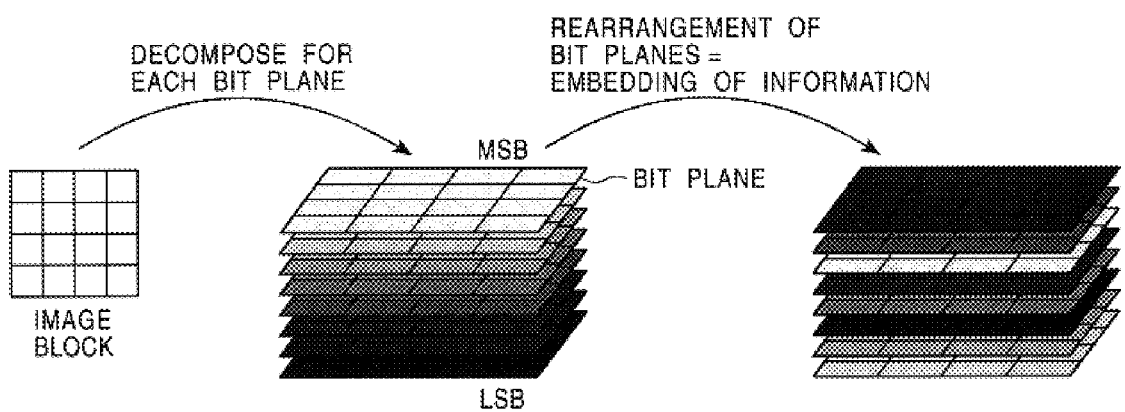
FIG. 7 is a view illustrating a process of a processor apparatus 34 of FIG. 6.

A recording medium 33 is formed from, for example, an optical disk, a magnetic disk, a magneto-optic disk, or a semiconductor memory, such as a CD-ROM (Compact Disc Read Only Memory) or an HD (Hard Disk). The recording medium 33 stores computer programs and required data by which a processor apparatus 34 is made to perform an embedded coding process (to be described later). The processor apparatus 34 executes a program stored in the recording medium 33 in order to perform an embedded coding process on image data supplied from the image database 1. That is, the processor apparatus 34 receives additional information supplied from the additional information memory 32 and embeds the additional information into the image stored in the image memory 31. Specifically, the processor apparatus 34 divides an image for each frame stored in the image memory 31, for example, digital image data, into predetermined blocks. Furthermore, as shown in FIG. 7, the processor apparatus 34 divides the block into bit planes for each bit of a bit sequence representing the pixel values of the pixels within the block. The processor apparatus 34 rearranges the bit planes within each block in accordance with the additional information stored in the additional information memory 32 in order to embed the additional information into the image, and outputs it as coded data.

The coded data output by the processor apparatus 34 is supplied to an output buffer 35, and the output buffer 35 temporarily stores the coded data and outputs it. The coded data output from the output buffer 35 is supplied to the recording medium 4 whereby the coded data is recorded thereon or is transmitted via the transmission medium 5.

The image memory 31 is formed of a plurality of banks so that a plurality of frames can be stored. As a result of switching banks, the image memory 31 is capable of simultaneously storing an image supplied from the image database 1 and storing an image for the object of an embedded coding process by the processor apparatus 34. It is possible for the embedded encoder 3 to perform real-time output of the coded data even if the image supplied from the image database 1 is a moving image.

Figure 8:
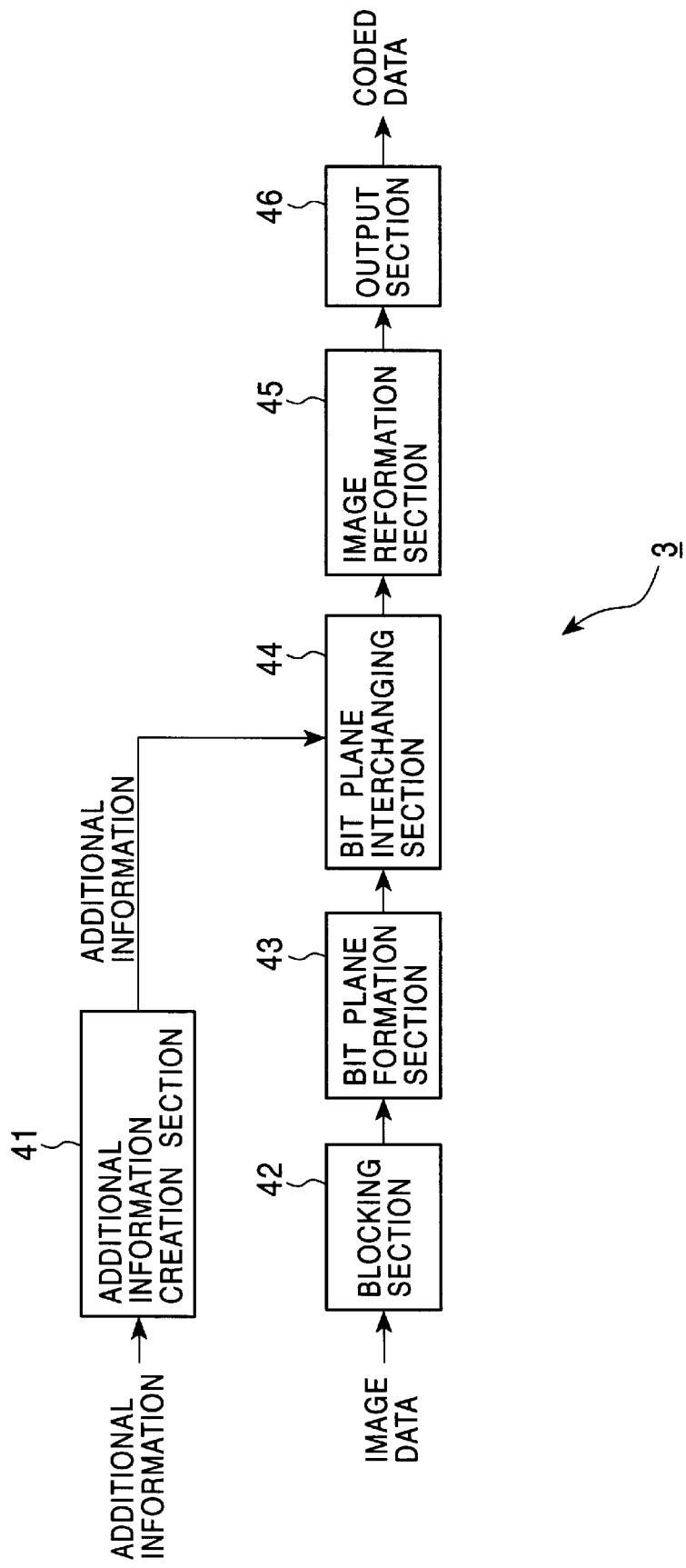
FIG. 8 is a block diagram showing an example of the functional construction of the embedded encoder 3.

Next, FIG. 8 shows an example of the functional construction of the embedded encoder 3 of FIG. 6. This functional construction shown in FIG. 8 is realized by the processor apparatus 34 executing a computer program stored in the recording medium 33.

An additional information creation section 41 reads the additional information stored in the additional information memory 32 shown in FIG. 6, converts the format of the additional information into a format appropriate for embedding into an image, and supplies the additional information to the bit plane interchanging section 44. The blocking section 42 reads an image stored in the image memory 31 shown in FIG. 6, for example, in frame units, divides the image into predetermined blocks, and supplies them to the bit plane formation section 43.

The bit plane formation section 43 divides each block supplied from the blocking section 42 into bit planes for each bit of a bit sequence representing the pixel values of the pixels which form the block, and supplies them to the bit plane interchanging section 44. That is, if it is assumed that, for example, 8 bits are assigned to the value of each pixel which is a constituent of the image, the bit plane formation section 43 forms a bit plane formed of each of the lowest-order bit of the pixel value within the block, the second bit from the lowest-order bit, the third bit . . . the seventh bit, and the highest order bit (i.e., the first to eighth bits), and supplies the bit planes to the bit plane interchanging section 44.

The bit plane interchanging section 44 rearranges the sequence of the bit planes of each block from the bit plane formation section 43 in accordance with the additional information supplied from the additional information creation section 41, thereby embeds the additional information into each block, and supplies it to an image reformation section 45.

Here, for example, as described above, if eight bits are assigned to the pixel value, eight bit planes are obtained from one block. Since there are 8! (! represents a factorial) ways of rearranging 8 bit planes, additional information of $\log_2 (8!)$ bits (the decimals are ignored) at maximum is embedded into one block. For example, the bit planes are rearranged in sequence. By rearranging the bit planes by the fifth rearrangement when the additional information is 5, and by rearranging the bit planes by the 20th rearrangement when the additional information is 20, the rearrangement itself becomes additional information. The additional information creation section 41 changes the additional information stored in the additional information memory 32 to a format in units of a number of bits which can be embedded into one block and supplies the additional information to the bit plane interchanging section 44.

The image reformation section 45 sequentially receives blocks in which the bit planes from the bit plane interchanging section 44 are rearranged. For example, the image reformation section 45 reconstructs an image of one frame from the received blocks for one frame. Then, the image reformation section 45 outputs the reconstructed image as coded data to an output section 46. The output section 46 outputs the coded data from the image reformation section 45 at a predetermined timing.

Figure 9:
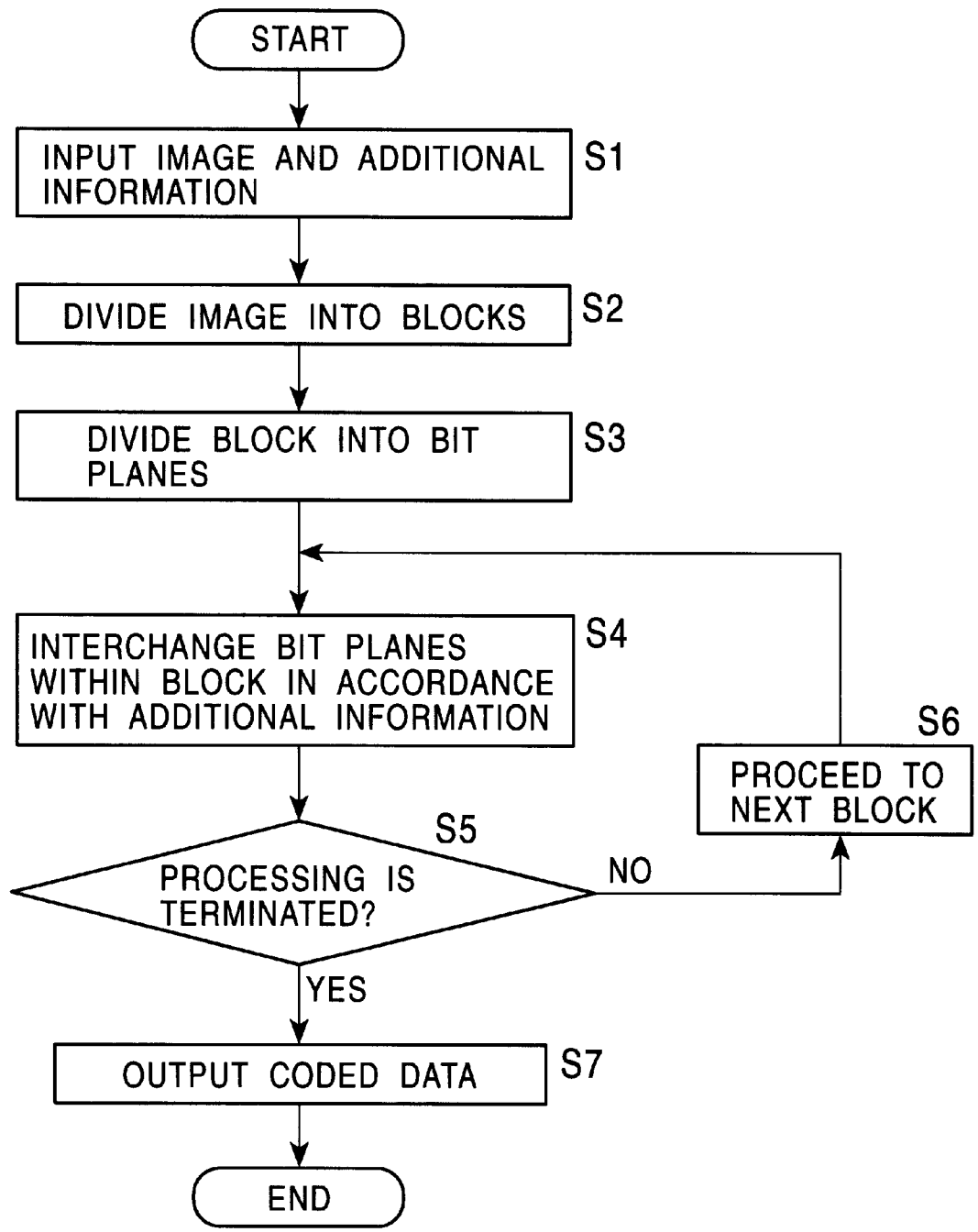
FIG. 9 is a flowchart illustrating an embedded coding process.

Next, referring to the flowchart in FIG. 9, a description is given of an embedded coding process performed in the embedded encoder 3 of FIG. 8.

Initially, in step S1, in the additional information creation section 41, additional information for an amount which can be embedded into an image of one frame is read from the additional information memory 32 and is received, and in the blocking section 42, an image, for example, digital image data, of one frame is read from the image memory 31 and is received.

Then, the process proceeds to step S2 where the blocking section 42 divides the image of one frame into predetermined blocks (for example, blocks of 4×4 (width×length) pixels) and supplies the blocks to the bit plane formation section 43. In the bit plane formation section 43, in step S3, each block from the blocking section 42 is divided into bit planes, and these are supplied to the bit plane interchanging section 44.

The additional information creation section 41 supplies the additional information to the bit plane interchanging section 44 at the timing at which the bit planes of each block are supplied from the bit plane formation section 43 to the bit plane interchanging section 44.

The bit plane interchanging section 44 receives the bit planes of each block from the bit plane formation section 43 and receives the additional information from the additional information creation section 41. In step S4, the bit plane interchanging section 44 uses a predetermined block from the bit plane formation section 43 as a subject block, rearranges the bit planes of the subject block in accordance with the additional information from the additional information creation section 41, and supplies the bit planes to the image reformation section 45.

Thereafter, the process proceeds to step S5, and in the bit plane interchanging section 44, it is determined by a controller, etc., whether or not a process, that is, a process for rearranging the bit planes, has been performed by using every block for one frame as the subject block. When it is determined by the controller that all the blocks of one frame have not been processed, the process proceeds to step S6 where a block which is not yet an object of processing, for example, a block next to the block which is currently a subject block in the sequence of line scans, is newly taken to be a subject block, and the process returns to step S4. Then, in response to new supplying of additional information from the additional information creation section 41 to the bit plane interchanging section 44, the processing of step S4 and subsequent steps is repeated.

When, in contrast, it is determined by the controller in step S5 that all the blocks of one frame have been processed, the process proceeds to step S7 where the image reformation section 45 reconstructs an image of one frame from the blocks for one frame, in which the bit planes have been rearranged, and supplies the image, as coded data, to the output section 46. Furthermore, in step S7, in the output section 46, the coded data from the image reformation section 45 is output, and the processing is terminated.

The above embedded coding process is performed for each frame.

As described above, as a result of the bit planes of each block being rearranged so as to correspond to additional information, additional information is embedded into each block. By performing the rearrangement in reverse on the coded data in which the additional information has been embedded, the original image is decoded therefrom, and the manner of rearrangement which has been performed becomes additional information. Therefore, the additional information is embedded into an image while minimizing the deterioration of the image quality of the image and without increasing the amount of data.

More specifically, regarding an image, basically, the higher the order of the bit plane, the higher the correlation between bits in the bit planes which form the block or the lower the order of the bit plane, the lower the correlation. Therefore, by using such correlation of the image, that is, the correlation between bits which form the bit plane, the bit planes which are rearranged in accordance with the additional information can be rearranged into the original sequence without overhead. Furthermore, the additional information can be decoded from the coded data in which the additional information has been embedded by the rearrangement process. Therefore, no deterioration of the image quality as a result of embedding additional information occurs in the decoded image thus obtained, that is, the reproduced image.

Figure 10:
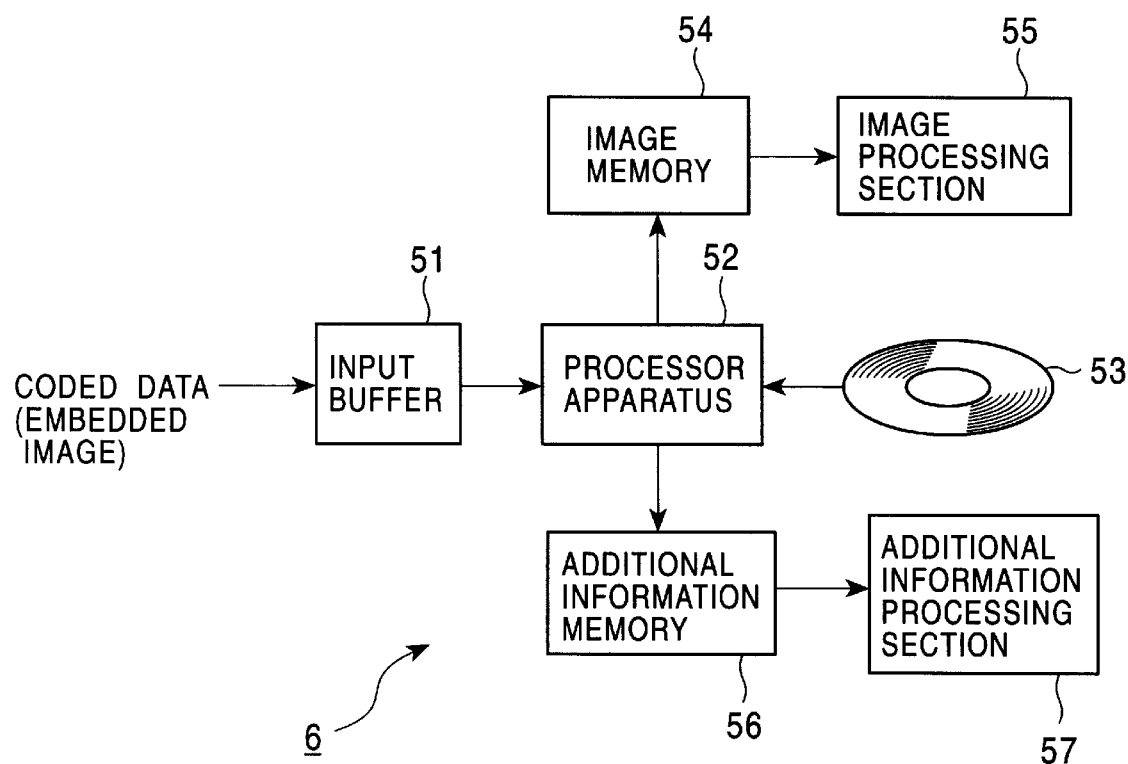
FIG. 10 is a block diagram showing an example of the construction of the hardware of a decoder 6 of FIG. 1.

Next, FIG. 10 shows an example of the construction of the hardware of the decoder 6 of FIG. 1, which decodes coded data output by the embedded encoder 3 of FIG. 6 into the original image and the additional information by using the correlation of the image. The operation of the decoder 6 is controlled by a controller (not shown), etc.

The coded data, that is, the image into which additional information is embedded (i.e., an embedded image) is supplied to an input buffer 51. The input buffer 51 temporarily stores the embedded image, for example, in frame units. The input buffer 51 is constructed similarly to the image memory 31 of FIG. 6, so that by switching banks, even if the embedded image is a moving image, real-time processing thereof is possible.

A processor apparatus 52 performs a decoding process (to be described later) by executing a program stored in a recording medium 53. That is, the recording medium 53, which is, for example, an optical disk, a magnetic disk, a magneto-optic disk, or a semiconductor memory, such as a CD-ROM or a HD, stores a program for performing a decoding process. The processor apparatus 52 executes the program in order to decode the embedded image stored in the input buffer 51 to the original image and the additional information by using the correlation of the image.

Specifically, the processor apparatus 52 divides an embedded image, for example, digital image data for each frame stored in the input buffer 51, into blocks in a manner similar to that for the processor apparatus 34 of FIG. 6, and divides each block into bit planes for each bit of a bit sequence representing the pixel values of the pixels which form the block. Furthermore, the processor apparatus 52 determines the correlation between bits within each bit plane of the block as the correlation of the bit planes.

Figure 11:
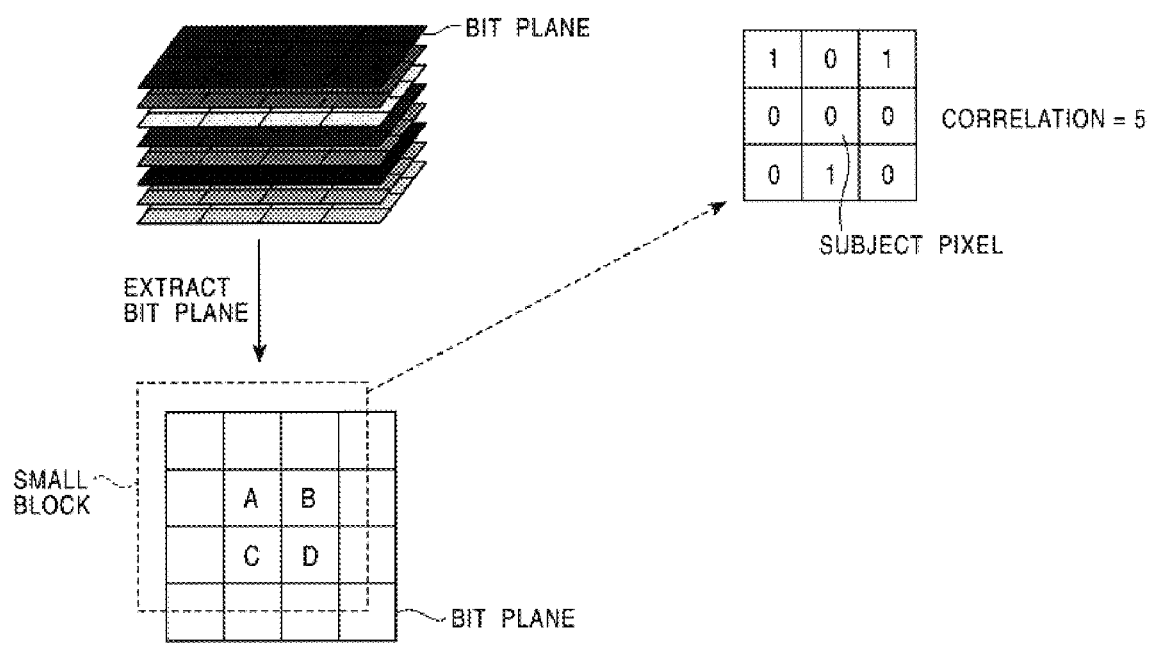
FIG. 11 is a view illustrating a method of calculating correlations within bit planes.

More specifically, for example, as shown in FIG. 11, initially, the processor apparatus 52 extracts bit planes for which the correlation is calculated from the block. Then, when the block is formed of, for example, 4×4 pixels as described above, the bit plane is also formed of 4×4 (width× length) bits. In this case, the processor apparatus 52 forms, for example, from the bit plane of 4×4 bits, a small block (for example, in FIG. 11, a small block of 3×3 bits) in which 2×2 bits, A, B, C, and D of the central portion, each being the center. Furthermore, the processor apparatus 52 counts the number of bits of the same value as that of the bit at the center with respect to each small block, and determines the count value as the correlation between the center pixel of the small block and another pixel thereof. Here, in FIG. 11, the correlation for the small block in which the bit A is the center from among the 2×2 bits, A, B, C, and D, of the central portion of the bit plane is calculated. The bit A is 0, and there are 5 bits having the same value as that of the bit A in the small block, and therefore, the correlation for the small block with the bit A being the center becomes 5.

The processor apparatus 52 determines correlation in a similar manner with respect to the other small blocks, adds together the correlations with respect to the small blocks with the bits A to D, each being the center, determined in this manner, and uses the addition value as the correlation of the bit planes.

Figure 12:
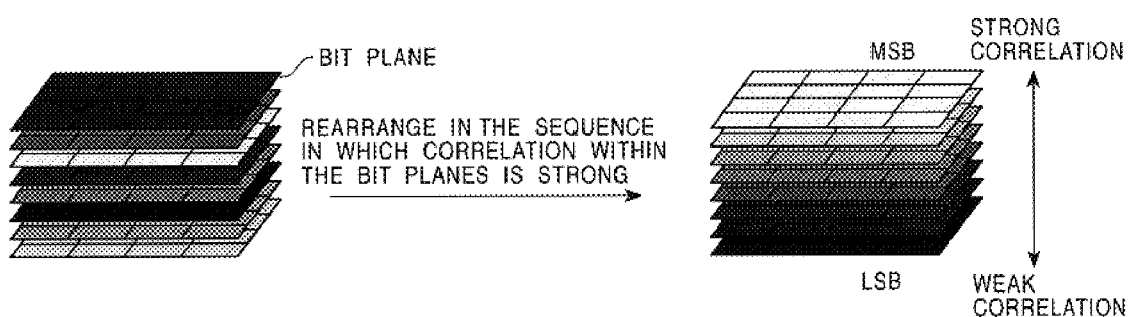
FIG. 12 is a view illustrating a process of a processor apparatus 52 of FIG. 10.

When the processor apparatus 52 determines the correlations of all the bit planes of the block, as shown in FIG. 12, the processor apparatus 52 decodes the block by rearranging the bit planes in such a way that the higher correlation of the bit plane, the more the bit plane is positioned at the higher order side, and the lower the correlation of the bit plane, the more the bit plane is positioned at the lower order side, that is, in the descending order of the correlations. Here, in FIG. 12 (the same also applies in FIG. 7 described above), the higher the density of the bit plane, the higher the correlation that the bit plane represents.

When the processor apparatus 52 decodes the blocks of the original image by rearranging the bit planes which form the block of the embedded image in ascending order in a manner as described above, the processor apparatus 52 supplies the decoded blocks to an image memory 54 whereby they are stored therein. Furthermore, the processor apparatus 52 detects the manner in which the bit planes have been rearranged by comparing the arrangement of the bit planes before being rearranged with the arrangement of the bit planes after being rearranged with respect to the decoded block, decodes the embedded additional information by rearranging the bit planes of the block on the basis of the detection result, and supplies the additional information to an additional information memory 56 whereby it is stored therein.

The image memory 54 receives a block from the processor apparatus 52 and temporarily stores it. When blocks for one frame are stored, the blocks for one frame are supplied to an image processing section 55. The image processing section 55, which is, for example, a display apparatus for displaying an image or a recording apparatus for recording images, displays an image supplied from the image memory 54, or records it, etc.

On the other hand, in an additional information memory 56, additional information from the processor apparatus 52 is received and is temporarily stored. Then, the additional information stored in the additional information memory 56 is read by an additional information processing section 57, and a displaying process and other processes are performed thereon.

Figure 13:
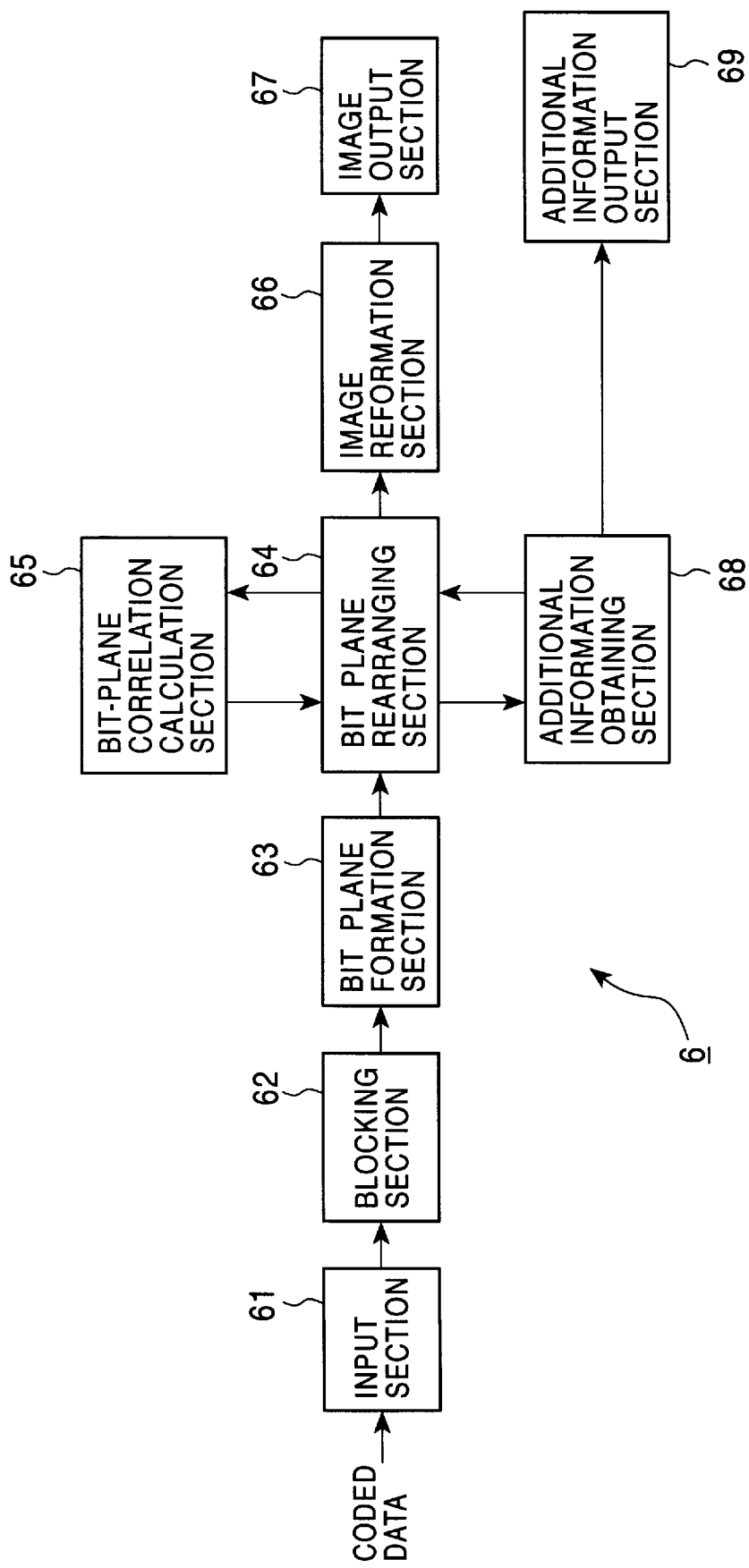
FIG. 13 is a block diagram showing an example of the functional construction of the decoder 6.

Next, FIG. 13 shows an example of the functional construction of the decoder 6 of FIG. 10. This functional construction shown in FIG. 13 is realized by the processor apparatus 52 executing a computer program stored in the recording medium 53.

An input section 61 receives an embedded image, that is, coded data, supplied to the decoder 6 and supplies it to the blocking section 62. The blocking section 62 divides the embedded image from the input section 61 into blocks in a manner similar to that for the blocking section 42 of FIG. 8 and supplies them to the bit plane formation section 63. The bit plane formation section 63 divides the blocks from the blocking section 62 into bit planes in a manner similar to the case in the bit plane formation section 43 of FIG. 8 and supplies them to the bit plane rearranging section 64.

The bit plane rearranging section 64 rearranges the bit planes which form the block from the bit plane formation section 63 in accordance with the correlation within the bit planes in order to decode the blocks of the original image and supplies the decoded blocks to an image reformation section 66. That is, the bit plane rearranging section 64 supplies the bit planes of the blocks from the bit plane formation section 63 to a bit-plane correlation calculation section 65 whereby, for example, the correlation of the respective bit planes such as that described in FIG. 11 is calculated. Furthermore, the bit plane rearranging section 64 rearranges the bit planes of the blocks so that the correlations determined by the bit-plane correlation calculation section 65 are arranged in ascending order, thereby decoding the blocks of the original image therefrom. Then, the bit plane rearranging section 64 supplies the decoded blocks to the image reformation section 66 and supplies, to the additional information obtaining section 68, the arrangement of the bit planes before being arranged and the arrangement of the bit planes after being arranged with respect to the decoded blocks.

The bit-plane correlation calculation section 65 calculates the correlation of bit planes under the control of the bit plane rearranging section 64.

When the image reformation section 66 sequentially receives blocks in which the bit planes from the bit plane rearranging section 64 are rearranged, that is, decoded blocks, and, for example, receives decoded blocks for one frame, the image reformation section 66 reconstructs the original image of one frame from the decoded blocks for one frame. Then, the image reformation section 66 supplies the reconstructed image as a decoded image to an image output section 67. The image output section 67 outputs the decoded image from the image reformation section 66 at a predetermined timing.

The additional information obtaining section 68 detects the manner in which the bit planes have been arranged by comparing the arrangement of the bit planes before being rearranged with respect to the decoded blocks from the bit plane rearranging section 64 with the arrangement of the bit planes after being arranged. The additional information obtaining section 68 decodes the embedded additional information as a result of rearranging the bit planes of the decoded blocks on the basis of the detection result. Then, the decoded additional information is supplied to an additional information output section 69. The additional information output section 69 outputs the additional information from the additional information obtaining section 68 at a predetermined timing.

Figure 14:
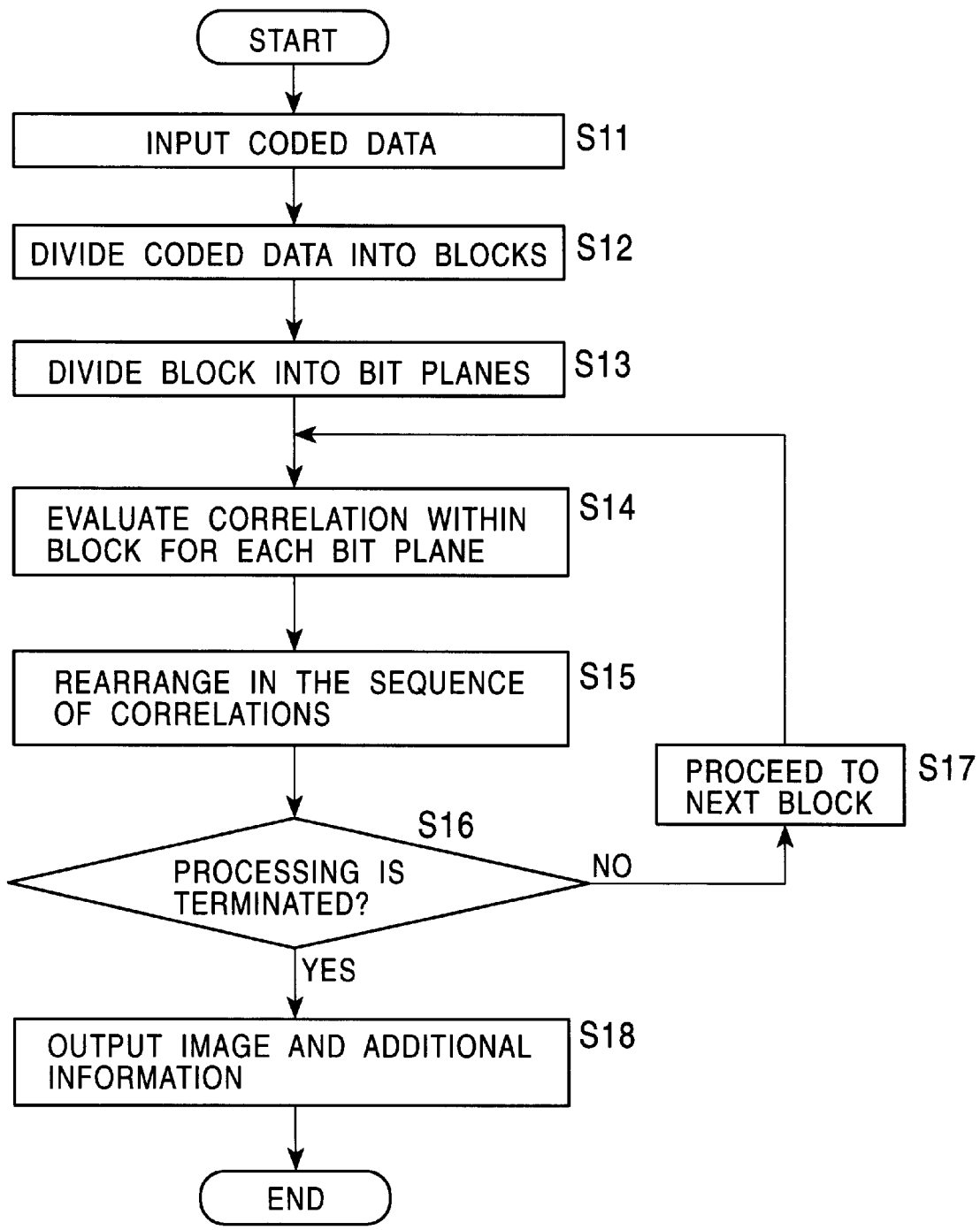
FIG. 14 is a flowchart illustrating a decoding process.

Next, referring to the flowchart in FIG. 14, a description is given of a decoding process performed in the decoder 6 of FIG. 13.

When an embedded image, that is, coded data, of one frame is supplied to the input section 61, in step S11, the input section 61 inputs the embedded image of one frame to the blocking section 62. In step S12, the blocking section 62 divides the embedded image of one frame into blocks and supplies the blocks thus obtained to the bit plane formation section 63. In step S13, the bit plane formation section 63 divides each block from the blocking section 62 into bit planes and supplies the bit planes to the bit plane rearranging section 64.

In step S14, the bit plane rearranging section 64 uses a predetermined block from the bit plane formation section 63 as a subject block, and causes the bit-plane correlation calculation section 65 to calculate the correlation of the respective bit planes of the subject block. Then, in step S15, the bit plane rearranging section 64 rearranges the bit planes of the subject block on the basis of the output of the bit-plane correlation calculation section 65 so that the correlations of the bit planes are arranged in ascending order, thereby decoding the blocks of the original image. Furthermore, the bit plane rearranging section 64 supplies the decoded blocks to the image reformation section 66, and supplies the information for the arrangement of the bit planes before being rearranged with respect to the decoded blocks and the information for the arrangement of the bit planes after being rearranged to the additional information obtaining section 68.

The additional information obtaining section 68 detects the manner in which the bit planes have been rearranged by comparing the arrangement of the bit planes before being arranged with respect to the decoded block with the arrangement of the bit planes after being arranged. The additional information obtaining section 68 decodes the embedded additional information on the basis of the detection result as a result of rearranging the bit planes of the decoded blocks, and supplies them to the additional information output section 69.

Thereafter, the process proceeds to step S16 where it is determined whether or not a process for rearranging the bit planes has been performed in the bit plane rearranging section 64 by using every block for one frame as a subject block. When it is determined by the controller that all the blocks of one frame have not yet been processed, the process proceeds to step S17 where, in a manner similar to the case in step S6 of FIG. 9, a block which is not yet an object of processing is newly used as a subject block, and the process returns to step S14, and the processing of step S14 and subsequent steps is repeated.

When, in contrast, it is determined by the controller in step S16 that all the blocks of one frame have been processed, the process proceeds to step S18 where the image reformation section 66 reconstructs the original image of one frame from the decoded blocks for one frame, in which the bit planes have been rearranged, and supplies the image, as a decoded image, to the image output section 67. The image output section 67 outputs the decoded image from the image reformation section 66, and furthermore, in the additional information output section 69, additional information from the additional information obtaining section 68 is output, and the processing is terminated.

The above decoding process is performed for each embedded image of one frame.

As described above, since coded data which is an image in which additional information is embedded is decoded into the original image and the additional information by using the correlation of the image, it is possible to decode the coded data into the original image and the additional information even if there is no overhead for the decoding. Therefore, no deterioration in the image quality as a result of embedding additional information occurs in the decoded image.

Next, as described above, regarding an image, basically, the higher the bit plane of the high-order bit, the higher the correlation of the bit planes which form the block; however, in some rare cases, there is a block which is not so. That is, there are cases in which there is a bit plane of a low-order bit having a correlation which is the same as or larger than the correlation of the bit plane of a high-order bit. Here, a block in which such a bit plane of a low-order bit is present is called an "unfit block" where appropriate.

On the other hand, in the decoding process, as described above, since the bit planes of the blocks of the embedded image are rearranged so that the correlations are in ascending order, the unfit block is not decoded correctly, and also, the additional information which is embedded therein is not decoded correctly.

Accordingly, in the embedded coding process, it is determined whether or not the block is an unfit block. When the block is an unfit block, it is not made an object in which the additional information is to be embedded, and information, that is, block information, for recognizing an unfit block can be added as overhead to the embedded image.

Figure 15:
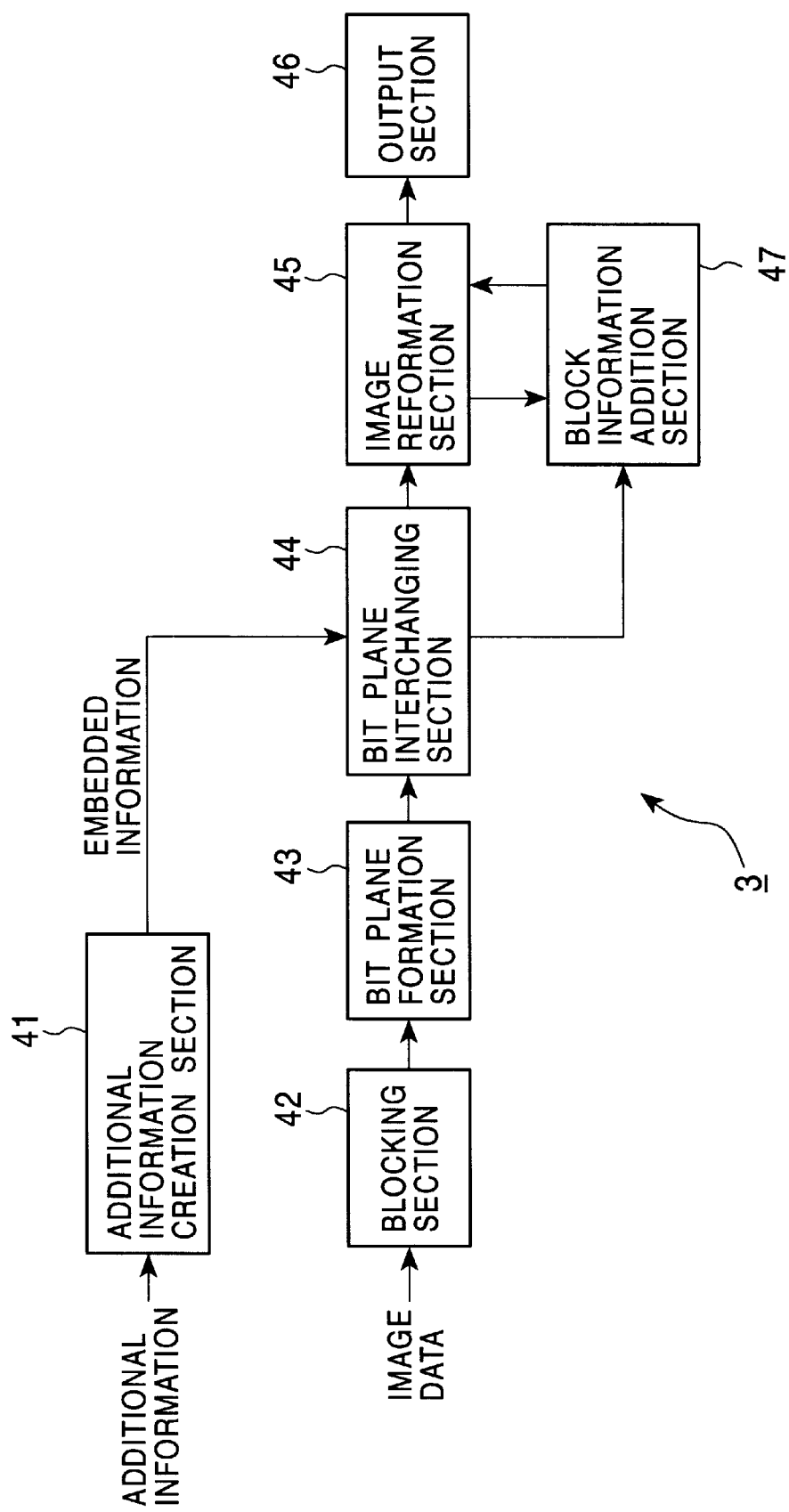
FIG. 15 is a block diagram showing another example of the functional construction of the embedded encoder 3.

FIG. 15 shows an example of the functional construction of the embedded encoder 3 for performing such an embedded coding process. Components in the figure which correspond to those in FIG. 8 are given the same reference numerals, and accordingly, the descriptions thereof are omitted in the following. That is, the embedded encoder 3 of FIG. 15 is basically constructed similarly to the case in FIG. 8 except that a block information addition section 47 is newly provided.

In the embodiment of FIG. 15, in the bit plane interchanging section 44, before the rearrangement of the bit planes which form the subject block is performed, the correlation within the respective bit planes which form the subject block is determined. Then, the bit plane interchanging section 44 determines whether or not a bit plane of a low-order bit having a correlation which is the same as or larger than the correlation of a bit plane of a high-order is present in the subject block. When there is not, that is, when the subject block is not an unfit block, similarly to the case in FIG. 8, the additional information is embedded into the subject block by interchanging the bit planes, and this is output to the image reformation section 45.

When, in contrast, the subject block is an unfit block, the bit plane interchanging section 44 outputs the information that the subject block is an unfit block, to the block information addition section 47 and outputs the block as it is to the image reformation section 45 without embedding the additional information into the subject block which is an unfit block.

When the block information addition section 47 receives the information that the subject block is an unfit block from the bit plane interchanging section 44, the block information addition section 47 supplies the block information for specifying the unfit block to the image reformation section 45 whereby the block information is added to the embedded image.

Here, for example, numbers which are sequential in the sequence of line scans are assigned in advance as block numbers to the blocks of the image, and as the block information, the block numbers can be used. As described above, since the case in which the block is an unfit block is rare, as a result of using the block numbers as block information, the block information as overhead, which is added to the embedded image, does not become a very large amount of data.

In a manner as described above, when block information is added to the embedded image in the embedded encoder 3, in the bit plane rearranging section 64 of the decoder 6 of FIG. 13, a check is made to determine whether or not the subject block is an unfit block in accordance with block information, and when the subject block is an unfit block, control is performed so that this is not made an object for a decoding process, making it possible to correctly decode the block and the additional information therefrom.

Although in this embodiment a block of 4×4 pixels is formed, when block information is not used, formation of a block from a larger number of pixels makes it possible to improve the accuracy of decoding of an image and additional information. However, since the formation of a block from a larger number of pixels reduces the number of blocks obtained from one frame, the amount of the additional information which can be embedded is reduced.

Although in this embodiment a pixel value is represented by 8 bits and all the eight bit planes which form the block are made objects for rearrangement, the bit planes for the objects of rearrangement can be made to be the bit planes of a part thereof. For example, when the bit plane of the highest-order bit and the bit plane of the lowest-order bit are made objects for rearrangement, since the probability that the correlation of the bit plane of the highest-order bit is larger than the correlation of the bit plane of the lowest-order bit is very high, that is, since there is hardly a case in which the correlation of the bit plane of the highest-order bit is equal to or less than the correlation of the bit plane of the lowest-order bit, it is possible to improve the accuracy of the decoding of the image and additional information, even if block information is not used. However, reduction of bit planes for the objects of rearrangement also causes the amount of the additional information which can be embedded to be reduced correspondingly.

Furthermore, it is also possible to perform the rearrangement of bit planes, for example, in units of a plurality of bit planes. That is, in this embodiment, a block is composed of 8 bit planes of the first to eighth bits. By using the adjacent bit planes of the first and second bits, the adjacent bit planes of the third and fourth bits, the adjacent bit planes of the fifth and sixth bits, and the adjacent bit planes of the seventh and eighth bits as one set, it is possible to perform the rearrangement in units of the bit planes of the set. In this case, as the correlation of each set, it is possible to use the sum, etc., of the correlation of two bit planes of the set. Also, in the case where the rearrangement of bit planes is performed in units of a plurality of bit planes, the accuracy of decoding of the image and the additional information can be improved. However, since the number of cases of rearrangement is reduced, the amount of additional information which can be embedded is also reduced correspondingly.

Therefore, it is preferable that, which bit planes should be used as objects and which combination should be used in which blocks are formed and the bit planes are rearranged, be appropriately determined by taking into consideration the balance between the accuracy of decoding and the amount of data of additional information which can be embedded.

Also, the method of calculating the correlation of bit planes is not limited to the above-described technique. That is, as the correlation of bit planes, when a particular bit of the bit planes is noted, any value may be used as long as it is a value which reflects that the bit having the same value as that of the subject bit is closer to the subject bit and the number of bits is greater. Therefore, even with two bit planes having the same numbers of 0's and 1's, the correlations of the two bit planes differ from each other depending upon the positions at which the 0's and 1's are arranged. That is, in a case in which in one of two bit planes, for example, 0's and 1's are arranged in the shape of 5 grids, and in the other, "1" is arranged in the left half and "0" is arranged in the remaining right half, the respective numbers of 0's and 1's are the same, but one bit plane is at a position at which each of 1 and 0 is at a position nearer thereto than the other bit plane, and therefore, the correlation may be evaluated to be larger. When the continuity of patterns of five grids is considered as continuity, the correlation for one becomes smaller than that for the other.

In addition, although in this embodiment a block is formed of pixels which are spatially adjacent, the block may be formed of, for example, pixels which are temporally adjacent.

Although in this embodiment a description is given using image data, data having correlation with adjacent data may be used, and audio data may also be used. Regarding blocking in the case of audio, that in which a plurality of pieces of audio data divided by predetermined time units, etc., are assemble d is called a "block", and regarding bit plane formation, that in which data at the same bit positions of each audio data is assembled for each bit position is called a "bit plane".

Also, although in this embodiment the processor apparatuses 34 and 52 are made to execute a computer program in order to perform an embedded coding process and a decoding process, respectively, these processes may be performed by hardware which is dedicated thereto.

Furthermore, although in this embodiment a computer program to be performed by the processor apparatuses 34 and 52 is stored in the recording medium 33 and 53, respectively, and is provided, in addition to this, the computer program may be provided via a transmission medium, such as the Internet, terrestrial waves, a satellite link, a public network, or a CATV network.

Also, information used as additional information is not particularly limited, and for example, images, voice, text, computer programs, a control signal, and other data can be used as additional information. If a part of the images of the image database 1 is made additional information and the remaining parts are made images to which additional information is to be embedded, since the part of the image which is made the additional information can be embedded into the remaining parts, the compression of images can be realized.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A coding apparatus for coding first data in accordance with second data, said coding apparatus comprising:

dividing means for dividing at least a part of said first data into bit planes; and coding means for embedding at least a part of said second data into said first data by interchanging the divided data in units of said bit planes in accordance with said second data.

2. A coding apparatus according to claim 1, further comprising correlation computation means for determining correlations of bits within each of said bit planes, wherein said coding means selects only blocks of said first data, in which the correlations are arranged in ascending order in a direction from the bit plane of a highest-order bit to the bit plane of a lowest-order bit, as objects of the interchanging in units of bit planes.

3. A coding apparatus according to claim 2, wherein said coding means excludes, from the objects of the interchanging in units of bit planes, blocks of said first data having bit planes in which the correlations are the same.

4. A coding apparatus according to claim 1, further comprising addition means for adding block information regarding a block of said first data, which is not an object of the interchanging in units of bit planes, to said first data in which said second data is embedded.

5. A coding apparatus according to claim 1, further comprising input means for inputting said first data and said second data.

6. A coding apparatus according to claim 1, wherein said first data is image data formed of a plurality of pixel data, and said coding means embeds data related to said second data into said first image data by interchanging at least one image block of said first image data in units of bit planes in accordance with said second data.

7. A coding apparatus according to claim 6, wherein said coding means interchanges at least one image block of said first image data in accordance with a value of said second data.

8. A coding method for coding first data in accordance with second data, said coding method comprising the steps of:

dividing at least a part of said first data into bit planes; and embedding at least a part of said second data into said first data by interchanging the divided data in units of said bit planes in accordance with said second data.

9. A decoding apparatus for decoding coded data in which first data is coded in accordance with second data, said decoding apparatus comprising:

dividing means for dividing at least a part of said coded data into bit planes;

correlation computation means for determining correlations between bits within each of said bit planes; and decoding means for decoding said coded data into said first original data by interchanging the divided data in units of said bit planes based on said correlations determined by said correlation computation means and said second data which is embedded into said coded data through said interchanging.

10. A decoding apparatus according to claim 9, further comprising determination means for determining whether or not said second data is embedded into a block of said coded data, wherein said decoding means selects said block only if said determination means determines that said second data is embedded as an interchanging object in said units of bit planes.

11. A decoding apparatus according to claim 10, wherein said determination means determines whether or not said second data is embedded into said block based on block information related to whether or not said second data is embedded into said coded data.

12. A decoding apparatus according to claim 9, wherein said decoding means interchanges bit planes so that the correlations within each bit plane are arranged in ascending order in a direction from the bit plane of a highest-order bit to the bit plane of a lowest-order bit.

13. A decoding apparatus according to claim 9, wherein said decoding means determines an interchanging pattern in said units of bit planes, of said coded data, and uses a value corresponding to said interchanging pattern as second data.

14. A decoding method for decoding coded data in which first data is coded in accordance with second data, said decoding method comprising the steps of:

dividing at least a part of said coded data into bit planes;

determining correlations between bits within each of said bit planes; and decoding said coded data into said first original data by interchanging the divided data in units of said bit planes based on said correlations and said second data which is embedded into said coded data through said interchanging.

15. A data processing system for coding first data in accordance with second data and for decoding said coded data, said data processing system comprising:

first dividing means for dividing at least a part of said first data into first bit planes;

coding means for embedding at least a part of said second data into said first data by interchanging the divided first data in units of said first bit planes in accordance with said second data;

second dividing means for dividing at least a part of said coded data into second bit planes; and correlation computation means for determining correlations between bits within each of said second bit planes; and decoding means for decoding said coded data into said first original data by interchanging the divided coded data in units of said second bit planes based on said correlations determined by said correlation computation means and said second data which is embedded into said coded data through said interchanging.

16. A storage medium for storing a computer-controllable program for coding first data in accordance with second data, said program comprising:

a dividing step for dividing at least a part of said first data into bit planes; and a coding step for embedding at least a part of said second data into said first data by interchanging the divided data in units of said bit planes in accordance with said second data.

17. A storage medium for storing a computer-controllable program for decoding coded data in which first data is coded in accordance with second data, said program comprising:

an instruction for dividing at least a part of said coded data into bit planes; and an instruction for decoding said coded data into said first original data by interchanging the divided data in units of said bit planes based on said correlations and said second data which is embedded into said coded data through said interchanging.

* * * * *